United States Patent
Raviv

(10) Patent No.: US 8,644,812 B2
(45) Date of Patent: Feb. 4, 2014

(54) SAFETY PROMOTING TECHNIQUES FOR MOBILE COMMUNICATION

(75) Inventor: Daniel Raviv, Boca Raton, FL (US)

(73) Assignee: Florida Atlantic University, Boca Raton, FL (US)

( * ) Notice: Subject to any disclaimer, the term of this patent is extended or adjusted under 35 U.S.C. 154(b) by 77 days.

(21) Appl. No.: 12/930,246

(22) Filed: Dec. 31, 2010

(65) Prior Publication Data

US 2011/0171943 A1    Jul. 14, 2011

Related U.S. Application Data

(60) Provisional application No. 61/335,711, filed on Jan. 11, 2010.

(51) Int. Cl.
    *H04M 3/00* (2006.01)
(52) U.S. Cl.
    USPC ........ 455/418; 455/456.1; 455/67.1; 455/466
(58) Field of Classification Search
    USPC .................................. 455/418, 456, 67, 466
    See application file for complete search history.

(56) References Cited

U.S. PATENT DOCUMENTS

| | | | |
|---|---|---|---|
| 6,353,778 B1* | 3/2002 | Brown | 701/1 |
| 2007/0072553 A1* | 3/2007 | Barbera | 455/67.11 |
| 2009/0224931 A1 | 9/2009 | Dietz et al. | 340/670 |
| 2009/0240464 A1 | 9/2009 | Dietz et al. | 702/143 |
| 2011/0212737 A1* | 9/2011 | Isidore | 455/466 |

OTHER PUBLICATIONS

S. Grobart, Driven to Distraction High Tech Baby Sitters Get Drivers Off Phone, NY Times, Nov. 22, 2009.
Texting While Driving Banned in Three States, West Palm Beach Examiner, Jan. 5, 2010.

* cited by examiner

*Primary Examiner* — David Q Nguyen
(74) *Attorney, Agent, or Firm* — Martin Novack

(57) ABSTRACT

A method for controlling operation of an active mobile communication device, including the following steps: performing a first determination of whether the device is in a moving vehicle at a relevant location; performing a second determination of whether the user of the device is the vehicle operator; and producing a risk indication signal as a function of the first and second determinations.

16 Claims, 5 Drawing Sheets

SAFETY PROMOTING TECHNIQUES FOR MOBILE COMMUNICATION

PRIORITY APPLICATION

Priority is claimed from U.S. Provisional Patent Application Ser. No. 61/335,711, filed Jan. 11, 2010, and said U.S. Provisional Patent Application is incorporated herein by reference.

FIELD OF THE INVENTION

This invention relates to the field of mobile communications and, more particularly, to promoting safety in use of mobile communication devices, such as cellular phones, by implementing safety-promoting action.

BACKGROUND OF THE INVENTION

Mobile communication devices, such as cellular telephones, are in widespread use throughout the world, and have many obvious benefits. However, certain uses of a cell phone by the operator of a moving vehicle can result in substantial distraction and concomitant safety hazard that risks injury or death to the user and the user's passengers, as well as occupants of other vehicles and pedestrians put in harm's way by a distracted operator. One example that has already become notorious, is cell phone "texting" by the operator of a motor vehicle.

The U.S. Patent Application Publication US2009/0224931 discloses a mobile device configured to have at least one function disabled when the speed of the mobile device exceeds a threshold. In an embodiment of the '931 Publication, when a determination is made that a mobile device is in motion above a threshold speed, a user interface on the device can notify the user of the device that a safety feature disabling the device or one or more functions of the device is about to be activated. The user can then be given an opportunity to prevent the safety feature from being activated and allow the mobile device to continue normal operation. The interface that notifies the user of the impending disablement of the mobile device might be a text-based message that appears on the display screen of the device, an automated voice message spoken by the device, an audible, visible, and/or tactile alarm signal, or some other type of output. As also described in the '936 Publication, upon receiving this notification, the user can provide an input into the mobile device to prevent the activation of the safety feature. For example, a driver who is willing to accept the safety risk of sending and receiving messages while driving may provide an input to override the safety feature. Alternatively, a passenger in an automobile being driven by another person or in a public transportation vehicle may not be an appropriate target for the safety feature and may choose to prevent the activation of the safety feature of the '931 technique.

The U.S. Patent Application Publication US200910240464 discloses a technique generally similar to that of the '931 Published Application. In an embodiment of the '464 Publication, frequency error distributions for Doppler shift measurements are used in determining the speed at which a mobile communication device is moving. Then, as in the '931 Publication, a determination is made as to whether a threshold speed has been exceeded, whereupon action can be taken.

While existing techniques, such as those described, are a step in the right direction, improvement is needed. For example, depending on various operational factors and safety assessments for individual situations, it may not be appropriate to provide an option to the operator of the mobile device. Further, the option itself, or implementation of a response thereto, may involve a degree of safety risk. Another shortcoming of existing approaches is the reliance on device speed alone in making a decision as to whether corrective action is necessary. It is among the objects of the invention to overcome these and other shortcomings or limitations of existing techniques.

SUMMARY OF THE INVENTION

It has been recognized in the prior art that the user of a mobile communication device may be a passenger in a moving vehicle. To date, the solution as been to give a passenger the option of overriding disabling controls or warnings resulting from detected speed of the mobile communication device. In accordance with a feature hereof, determination of driver/passenger status of the device user can, in many instances, be made with a relatively high probability, thereby providing greater flexibility of action.

In accordance with a first form of the invention, a method is set forth for controlling operation of an active mobile communication device, including the following steps: performing a first determination of whether said device is in a moving vehicle; performing a second determination of whether the user of said device is the vehicle operator; and producing a risk indication signal as a function of said first and second determinations. In an embodiment of this form of the invention, the of performing said second determination includes determining the relative position of said device in the vehicle. In this embodiment, the step of performing said second determination includes determining the presence of a proximity group of communication devices, and determining the relative position of said active mobile device in the proximity group. The determining of the relative position of said active mobile device can be performed at a plurality of successive times, and the relative positions obtained at a plurality of times can be interpolated to obtain a refined relative position. Also in this embodiment, the determining of the relative position of said active mobile device in said proximity group is performed with respect to the direction of motion of the proximity group.

In an embodiment of this first form of the invention the risk indication signal comprises a conditional disabling signal, and at least one function of said device is disabled in response to said risk indication signal when a predetermined condition has been met. In this embodiment, the predetermined condition includes at least one factor selected from the group consisting of geographical features at the location of the vehicle, traffic, weather conditions, and time of day. Also in this embodiment, the step of performing said first determination includes determining the speed of said moving vehicle, and the risk indication signal is also a function of said determined speed. In one embodiment, said first determination and/or said second determination are determined using probabilities, and the detecting of whether said probabilities exceed predetermined thresholds.

In an embodiment of this form of the invention, at least one function of said device is disabled in response to a risk indication signal. The at least one function can be a tactile input function, such as manual texting, which is dangerously distracting for a vehicle operator.

In an embodiment of a further form of the invention, a method is set forth for controlling operation of an active mobile communication device, comprising the steps of: performing a determination of whether said device is in a moving vehicle at a relevant location; and producing a risk indication signal as a function of said determination. A warning can be issued and/or at least one function of the device can be disabled in response to said risk indication signal. In an embodiment of this form of the invention, the risk indication signal comprises a conditional disabling signal, and at least one function of said device can be disabled in response to said risk indication signal when a predetermined condition has been met. The predetermined condition can include at least one factor selected from the group consisting of geographical location of the vehicle, weather conditions, and time of day.

Further features and advantages of the invention will become more readily apparent from the following detailed description when taken in conjunction with the accompanying drawings.

DETAILED DESCRIPTION

Figure 1:
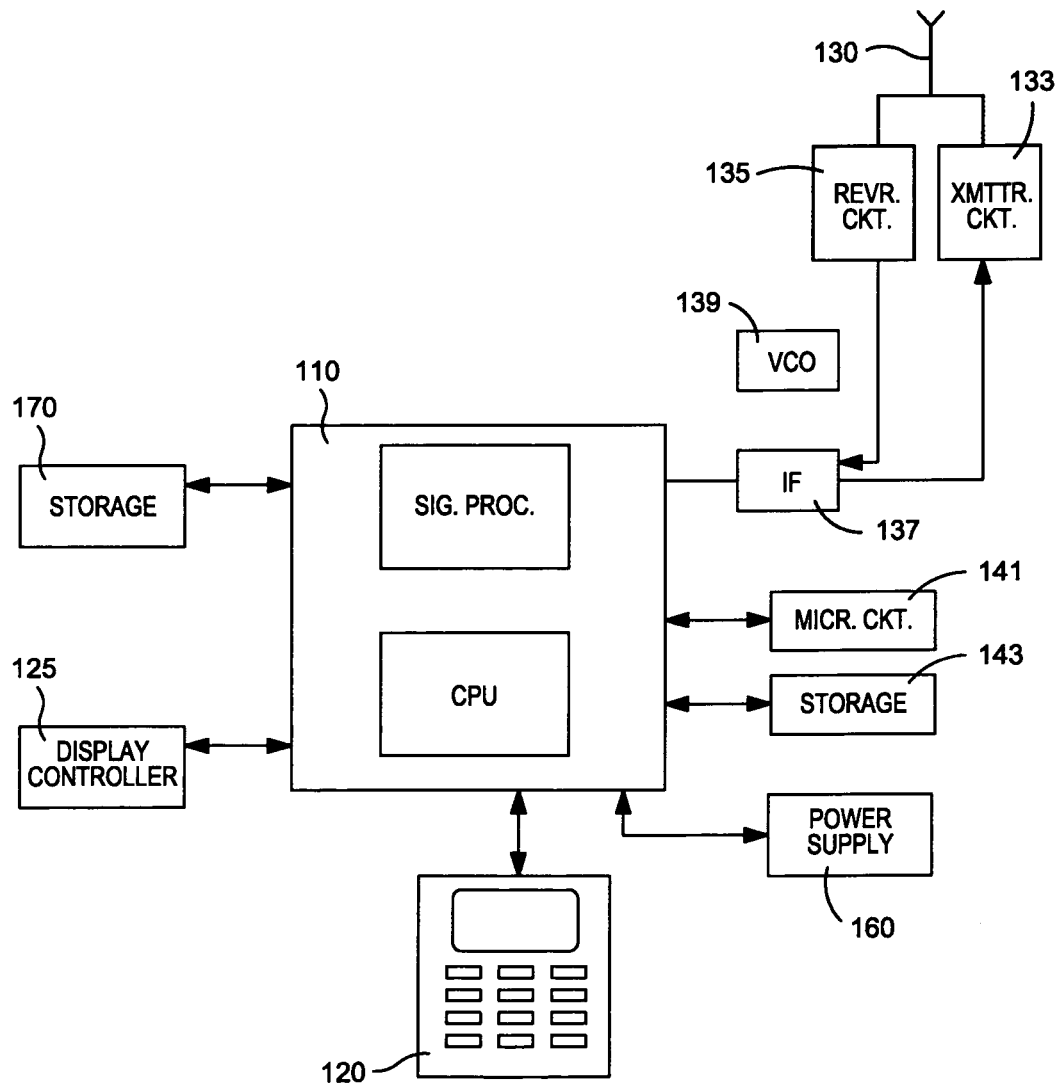
FIG. 1 is a bock diagram of a mobile communication device used as an example of a type of device that will be subject to receiving risk indication signals or control signals in accordance with embodiments of the invention.

Referring to FIG. 1, there is shown a block diagram of a typical cell phone, it being understood that the features hereof are not dependent on use of any particular type of cell phone or other mobile communications device. The main computational subsystem is represented at 110, and includes, inter alia, signal processing unit 102 and central processing unit (CPU) 104. As is well known, specialized digital signal processing (DSP) chips are typically used for implementation of part of these functions. The device key pad and display are represented at 120, and can typically include any suitable kind of input media and display media. A display controller circuit, for example including an LCD module controller, backlit driver, etc., is represented at 125. An antenna 130 is coupled with transmitter circuitry 133 and receiver circuitry 135, which are respectively coupled with the processor 110 via an IF stage 137. A voltage-controlled oscillator 139 conventionally provides appropriate frequency signals to the IF stage. Microphone and speaker circuitry are represented at 141 and 143, respectively. Power supply module 160 includes a charging circuit for the battery (not separately shown) and an appropriate voltage conversion circuit. Storage is represented at 170, and will typically include, at least, a flash memory module.

Figure 2:
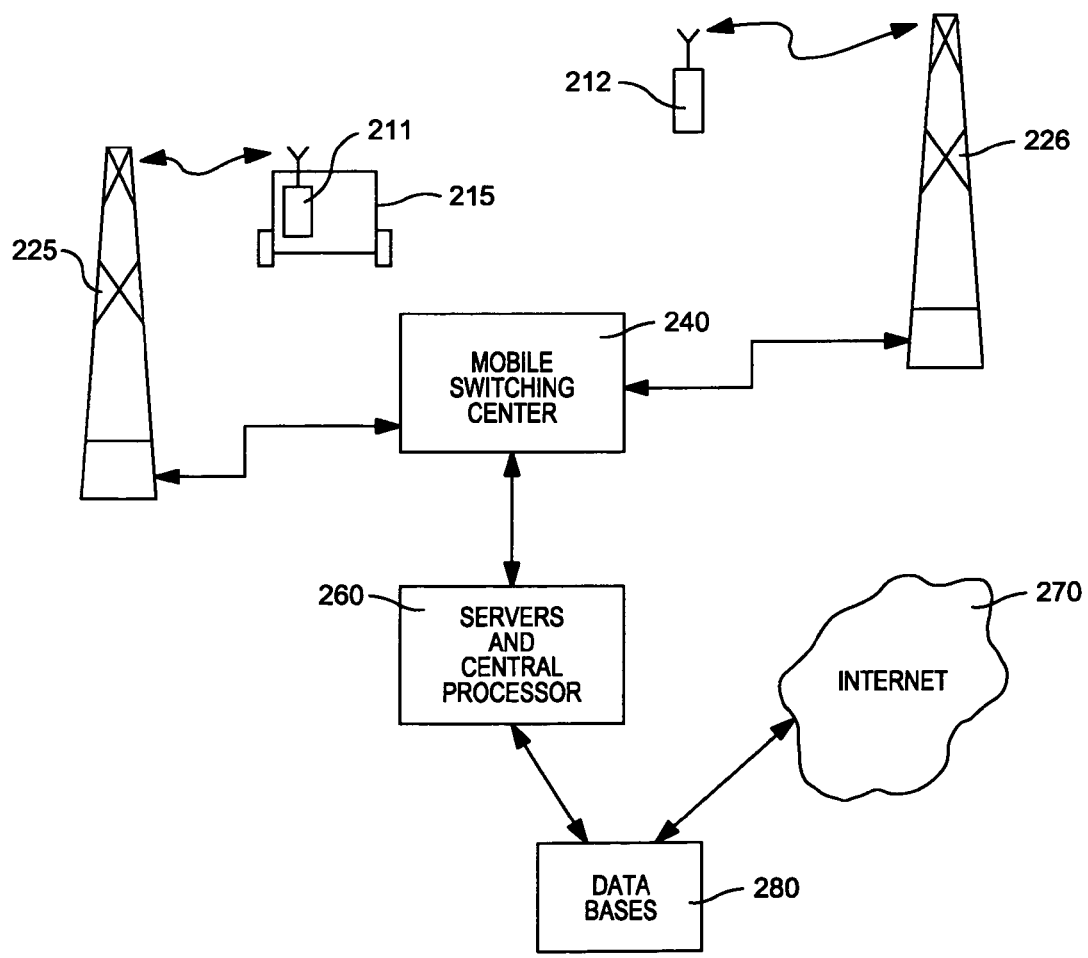
FIG. 2 is a simplified block diagram, partially in schematic form, of part of an existing type of GSM in conjunction with which embodiments of the invention can be implemented, and which includes a processor that can be programmed to implement techniques in accordance with embodiments of the invention.

Referring to FIG. 2, there is shown a simplified diagram of part of an existing type of "GSM" or "global system for mobile communication" in conjunction with which embodiments of the invention can be implemented. As is well known, the GSM uses digital radio transmission to provide voice, data, and multimedia communication services. (It will be understood that the invention can operate in the content of any other suitable type of communication system.) Among other functions, the GSM of this example operates to coordinate and control the communication between mobile telephones (such as examples shown at 211 and 212, with 211 being in vehicle 215), base stations/towers (such as examples shown at 225 and 226), and a mobile switching center represented at 240. Servers and one or more central processors, represented at 260, communicate with the mobile switching center 240 and with the internet, represented at 270. Data bases, represented generally at 280, are available to the central processor, directly and/or via internet. In an example hereof the central processor can be programmed to implement an embodiment of the technique of the invention.

Mobile device systems can detect location of active mobile devices (e.g., cell phones). Sometimes mobile devices can detect their own locations. This knowledge is acquired in substantially "real time" using information that can be obtained, for example, from satellites (GPS systems), relative locations of cell towers (triangulation), beacon systems, etc. Collecting this information over time (for at least two time instants) allows for the estimation of the velocity vector of mobile devices.

Figure 3:
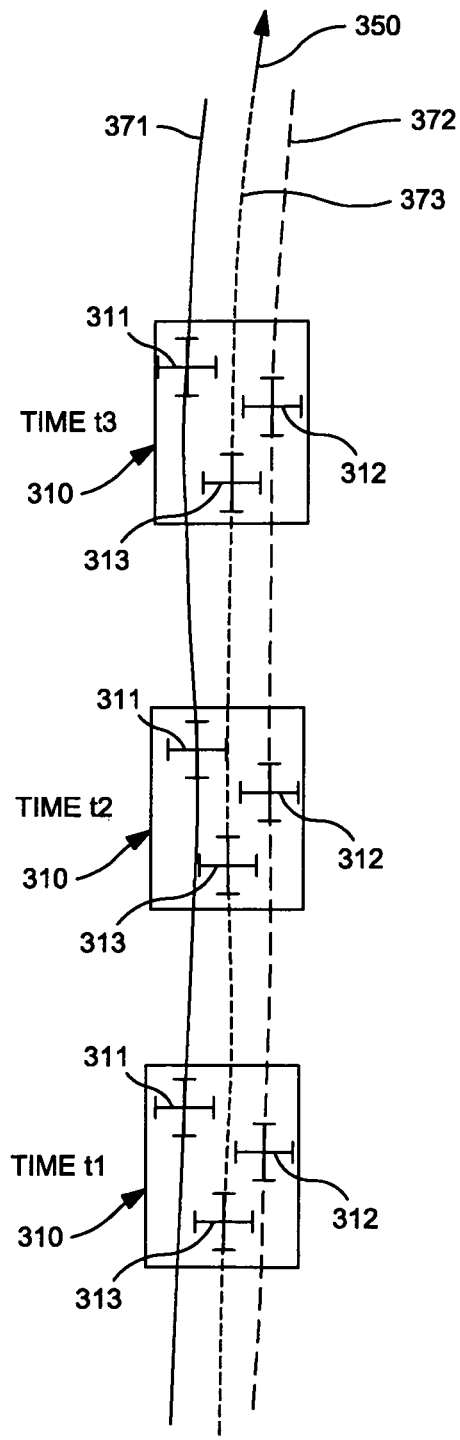
FIG. 3 shows an example of a moving vehicle containing plural mobile communication devices, which is useful in understanding operation of an embodiment of the invention.

FIG. 3 shows an example of a moving vehicle 310 at times t1, t2, and t3. Three determined positions in the vehicle are represented by 311, 312, and 313, respectively. In this example, the position 311 turns out to be the vehicle operator (driver) position, the position 312 turns out to be a passenger position, and position 313 turns out to be a "chip" (fixed in vehicle) position. (It will be understood, throughout, that references to a mobile communication device can also include an integrated circuit or chip that may, for example, be fixed in a vehicle, and which performs an essential function of the mobile communications device.) The crossed axes at each position represent uncertainly in position location of the mobile devices in this proximity group. The solid curved line 371, the dashed curved line 372, and the dotted curved line 373, respectively represent the tracking of the three mobile devices (or "chip" in the case of 313), as a function of time, as the vehicle proceeds in a general direction of motion indicated by arrow 350. The curves are constructed based on multiple measurement points to improve accuracy of the location (and relative location) of the respective mobile devices in the proximity group. (It will be understood that the timing associated with different mobile devices, which can be on different provider systems, may differ with respect to each other of with respect, for example, to a given universal clock, and that appropriate correction for such differences, including corrections for fundamental clock differences, delays, or the like, can be appropriately made.) The more separated the curves, the better distinction between location of mobile devices (or fixed points in the proximity group) can be achieved.

With no a priori knowledge, operator (e.g. driver) position may be obtainable by identifying a group of moving mobile devices (e.g. cell phones) that are moving at approximately the same speed at a relevant location, and maintaining approximately the same relative positions with respect to each other. The mobile devices (in this proximity group) are then likely to be located in the same vehicle, and the "left front" mobile device (e.g., cell phone) is likely to be the one used by the driver. (In some other countries or cases, e.g., mailman, it would be "right front".) A way of detecting "front" is by finding the direction of motion. The system can detect that particular mobile device (e.g. cell phone) and apply desired action or restriction. In the case of a driver with no passengers, the mobile device (e.g. cell phone) in use is the mobile device used by the driver.

Identification of a vehicle operator in a proximity group can be aided by overlaying locations of mobile devices (e.g. cell phones) with available maps (satellite-based, or others, e.g. on-line maps): For example, if the mobile device appears to be moving on a railroad track, then it is probably used by a passenger and not by the vehicle operator. If the mobile device appears to be moving in an amusement park where the holder does not operate a vehicle but still moves, then there is no reason to implement safety promoting action.

Mapping can also be used to increase the probability of identifying the vehicle operator by determining the location of the mobile device relative to the center of a highway lane. If, for example, the mobile device is identified to be on the left of the center of the lane on which the vehicle is moving, then it means that it is more likely to be the mobile device used by the driver or a passenger behind the driver, and not by other people in the vehicle. This increases the probability of identifying the driver. Within the grouping, the "front" mobile device is likely to be used by the driver. Also, if there is no mobile device activity to the near right of the driver, then the mobile device activity is more probably coming from the driver himself/herself, since normally if there is more than one person in the car, that person is likely to sit next to the driver.

Mapping that includes a third dimension, namely altitude, can also be utilized to advantage. For example, based on geographical input and altitude, the presence of the active mobile communication device in an aircraft can be discerned, with appropriate restriction or limitation of use being applied.

Figure 4A:
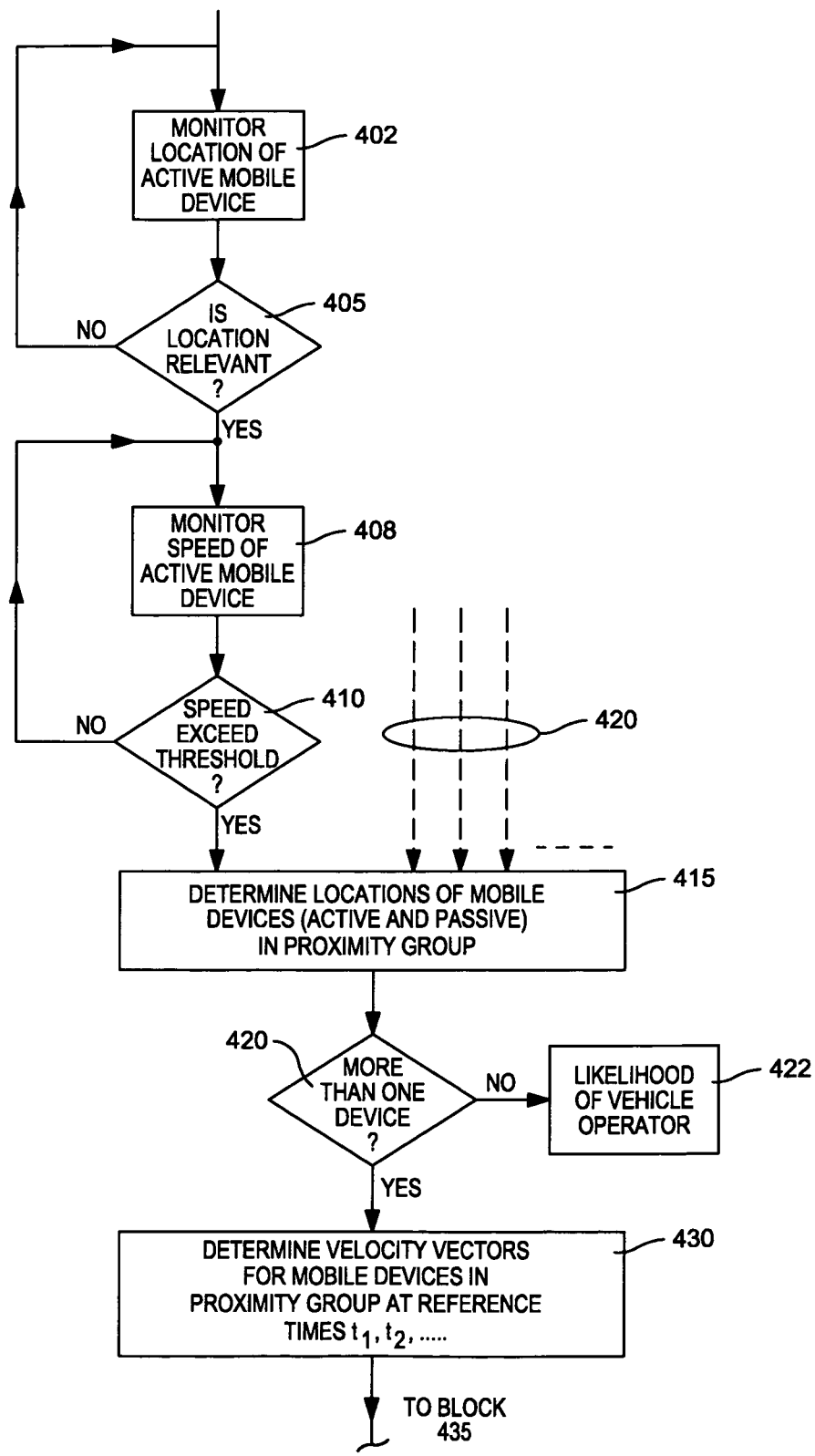
FIG. 4, which includes FIGS. 4A and 4B placed one below another, is a flow diagram of a routine for controlling a machine processor for implementing embodiments of the invention.
Figure 4B:
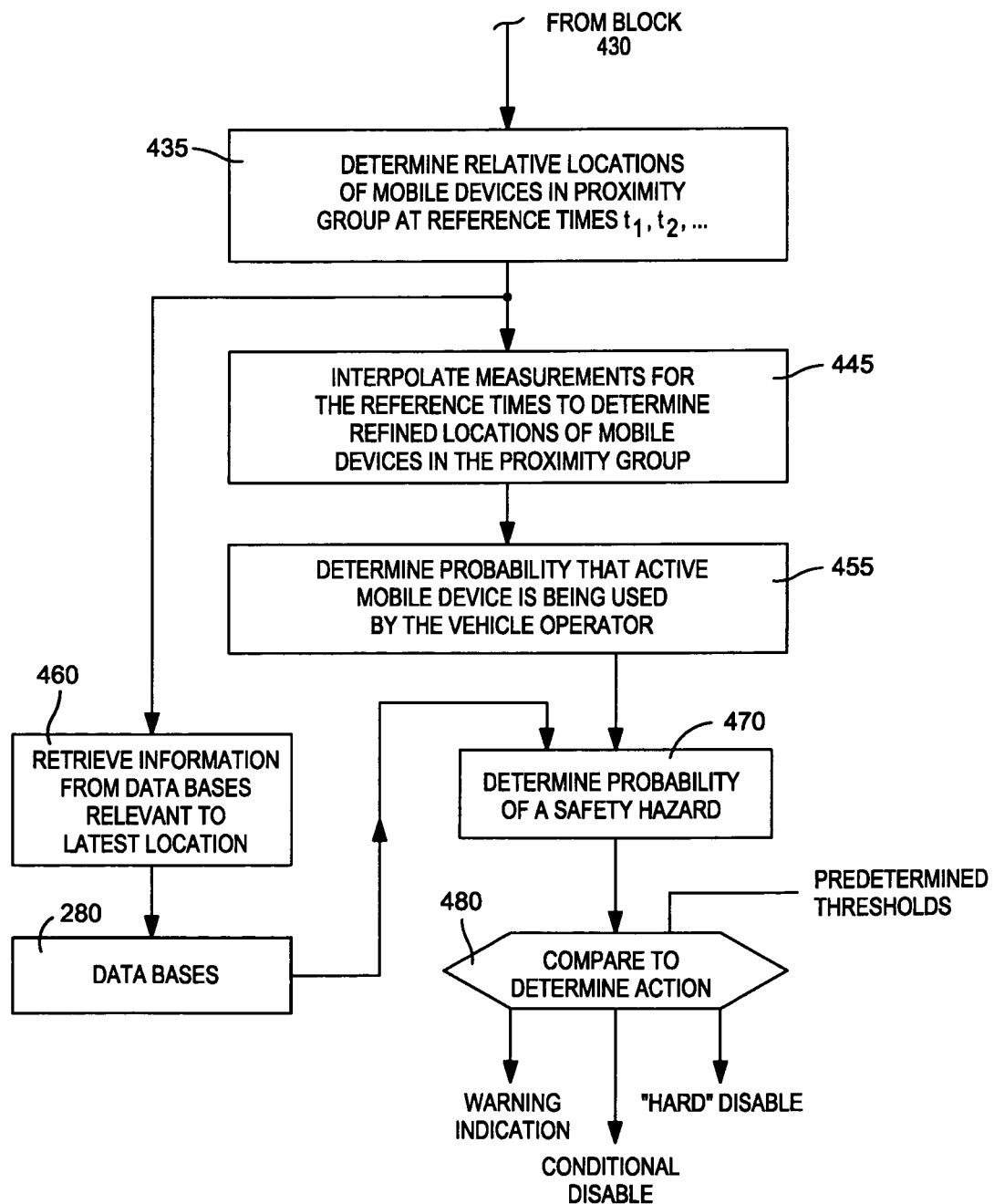

FIG. 4 is a flow diagram of a routine for controlling the processor of FIG. 2 (and/or additional or alternative processors) to implement a technique in accordance with an embodiment of the invention for determining the use of an active mobile communication device by a vehicle operator in a situation where plural mobile communication devices, such cell phones, are present in a moving proximity group. The block 402 represents monitoring the location of an active mobile device, and the decision block 405 represents determination of whether the location is considered relevant. When this condition is met, the block 408 represents the monitoring of the speed of the active mobile device, it being understood that inquiry is continuously made (decision block 410) as to whether the monitored speed exceeds a predetermined threshold. If not, monitoring is continued. If so, however as represented by the block 415, locations of mobile communications devices in a defined proximity group are determined. These operations will typically be performed in parallel for a multiplicity of devices at relevant locations (dashed arrows 420). The devices may be in use (active) or passive, but in a mode where positional determination can be implemented. The size of the proximity group, including uncertainties, can be modified, depending on positional map determination, which can indicate whether vehicular motion is more likely to be a private vehicle or public transportation such as may be indicated by a mapped railroad track region, a mapped bus lane, etc.

Next, inquiry is made (decision block 420) as to whether more than one device is involved. If not, the device is considered as having a substantial likelihood of being the vehicle operator (block 422). If so, the block 430 represents determination of velocity vectors for the mobile communication devices in the proximity group at reference times $t_1, t_2, \ldots$ (see the example of FIG. 3). Then, as described, initial values for the relative locations of the mobile devices in the proximity group (vehicle) can be determined at the referenced times (block 435). The block 445 represents an optional interpolation of measurements at the referenced times, $t_1, t_2, \ldots$ to minimize positional uncertainty and obtain refined locations of mobile communication devices in the proximity group (see, again, FIG. 3 and its accompanying description). Then, the block 455 represent the determination of the probability that the active device is being used by the person at the position of the vehicle operator.

Referring back to block 435, the output thereof is also input to block 460, which represents the retrieving of information from the data bases 280 (see FIG. 2) that is relevant to the latest location, for example, geography of the location, weather at the location, traffic, time of day, etc. These factors, together with the determined speed and the probability of use by a vehicle operator, are used, in the example of this embodiment, to determine the probability of a safety hazard (block 470). Then, as represented by the block 480, determination is made based on the hazard probability and predetermined thresholds, of action to be taken. In the example of the present embodiment, these actions include sending a warning indication signal, issuing a conditional disabling signal, and, at the higher levels of probability of safety hazards, issuing a "hard" disabling signal.

The invention has been described with reference to particular preferred embodiments, but variations within the spirit and scope of the invention will occur to those skilled in the art. For example, it will be understood that other techniques, consistent with the principles hereof, can be used to detect a probability or certainty that the active mobile communication device is being utilized by the vehicle operator.

The invention claimed is:

1. A method for controlling operation of an active mobile communication device, comprising the following steps implemented using a machine processor:
   performing a first determination of whether said device is in a moving vehicle, including determining the relative position of said device in the vehicle;
   performing a second determination of whether the user of said device is the vehicle operator, said second determination including determining the presence of a proximity group of communication devices, and determining the relative position of said active mobile device in said proximity group; and
   producing a risk indication signal as a function of said first and second determinations.

2. The method as defined by claim 1, wherein said determining of the relative position of said active mobile device is performed at a plurality of times.

3. The method as defined by claim 2, wherein said relative positions obtained at a plurality of times are interpolated to obtain a refined relative position.

4. The method as defined by claim 1, wherein said determining of the relative position of said active mobile device in said proximity group is performed with respect to the direction of motion of the proximity group.

5. The method as define by claim 1, further comprising disabling at least one function of said device in response to said risk indication signal.

6. The method as defined by claim 5, wherein said at least one function comprises a tactile input function.

7. The method as defined by claim 6, wherein said tactile input function comprises manual texting.

8. The method as described by claim 1, wherein said risk indication signal comprises a conditional disabling signal, and further comprising disabling at least one function of said device in response to said risk indication signal when a predetermined condition has been met.

9. The method as defined by claim 8, wherein said predetermined conditions include at least one factor selected from the group consisting of geographical features at the location of the vehicle, traffic, weather conditions, and time of day.

10. The method as defined by claim 1, wherein said step of performing said first determination includes determining the speed of said moving vehicle, and wherein said risk indication signal is also a function of said determined speed.

11. The method as defined by claim 1, wherein said first determination and/or said second determination are determined using probabilities.

12. The method as defined by claim 11, wherein said first determination and/or said second determination is determined by detecting whether said probabilities exceed predetermined thresholds.

13. The method as defined by claim 1, wherein said step of performing said first determination includes determining the velocity of motion of the device, and determining, using other inputs, whether the device is in an operator-controlled vehicle.

14. The method as defined by claim 13, wherein said other inputs include geographical inputs relating to the vehicle and/or device location.

15. The method as defined by claim 1, wherein said performing of said second determination includes spatial and/or temporal computations from which the relative position of the device in a vehicle can be determined.

16. The method as defined by claim 1, wherein said risk indication signal is generated at a remote mobile communication station and transmitted to said device.

\* \* \* \* \*